(12) United States Patent
Terashima et al.

(10) Patent No.: US 7,175,083 B2
(45) Date of Patent: Feb. 13, 2007

(54) CARD PROCESSING APPARATUS

(75) Inventors: Toshikatsu Terashima, Nagano (JP); Eishi Ozawa, Tokyo (JP)

(73) Assignees: Mars Engineering Corporation, Tokyo (JP); Wintec Co., Ltd., Nagano (JP)

( * ) Notice: Subject to any disclaimer, the term of this patent is extended or adjusted under 35 U.S.C. 154(b) by 295 days.

(21) Appl. No.: 10/847,319

(22) Filed: May 18, 2004

(65) Prior Publication Data

US 2004/0232244 A1 Nov. 25, 2004

(30) Foreign Application Priority Data

May 19, 2003 (JP) .............................. 2003-139854

(51) Int. Cl.
*G06K 7/00* (2006.01)
(52) U.S. Cl. .................................... 235/439
(58) Field of Classification Search ................. 235/439
See application file for complete search history.

(56) References Cited

U.S. PATENT DOCUMENTS 3,597,076 A * 8/1971 Hubbard et al. .............. 355/29
5,606,158 A * 2/1997 Takemoto et al. ........... 235/380
6,805,286 B2 * 10/2004 Hilton et al. ................ 235/379

FOREIGN PATENT DOCUMENTS

| JP | 8-297722 A | 11/1996 |
| JP | 9-259334 A | 10/1997 |
| JP | 10-232908 A | 9/1998 |
| JP | 10-254999 A | 9/1999 |
| JP | 2001-34815 A | 2/2001 |
| JP | 2003-030589 A | 1/2003 |

OTHER PUBLICATIONS

Partial Translation of JP 2001-34815 A, published Feb. 9, 2001, Nakajima et al.
Partial Translation of JP 2003-30589 A, published Jan. 31, 2003, Ide et al.

* cited by examiner

*Primary Examiner*—Jared J. Fureman
*Assistant Examiner*—Tae W. Kim
(74) *Attorney, Agent, or Firm*—Birch, Stewart Kolasch & Birch, LLP

(57) ABSTRACT

The card processing apparatus is capable of reissuing a card-shaped storage medium and omitting a trouble of collecting accommodated card-shaped storage media. The card processing apparatus comprises: means for processing the card-shaped storage medium, which reads data from and writes data in the card-shaped storage medium; means for transferring the card-shaped storage medium, which has been accommodated in a card accommodating section; a movable guide section distributing the card-shaped storage medium to the card accommodating section or a card outlet according to a position thereof; means for changing the position of the movable guide section; and a control section selectively feeding the card-shaped storage medium to the card accommodating section, outside of a card inlet or outside of the card outlet.

18 Claims, 9 Drawing Sheets

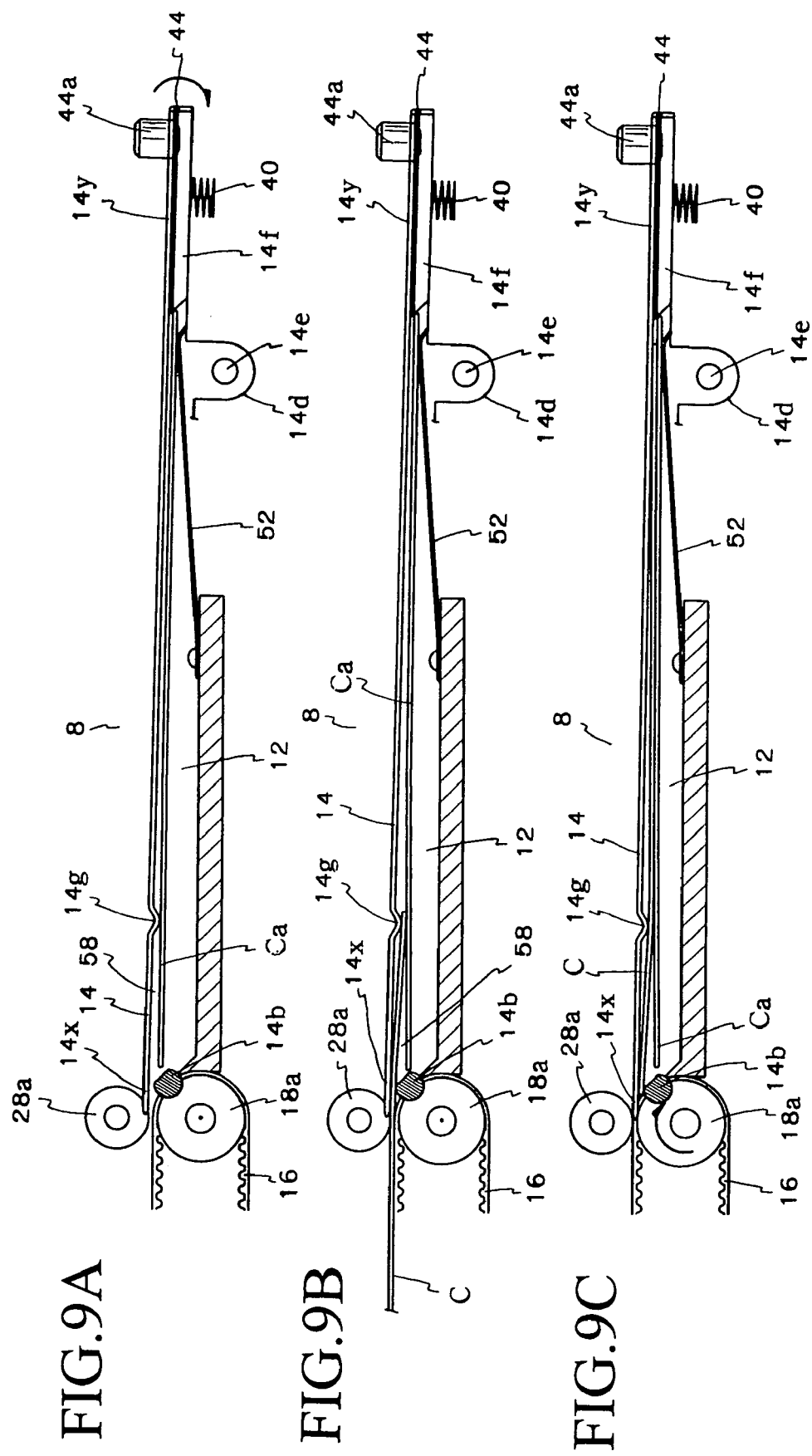

CARD PROCESSING APPARATUS

This Non-provisional application claims priority under 35 U.S.C. § 119(a) on Patent Application No(s). 2003-139854 filed in Japan on May 19, 2003, the entire contents of which are hereby incorporated by reference.

BACKGROUND OF THE INVENTION

The present invention relates to a card processing apparatus, more precisely relates to a card processing apparatus capable of reading data from and/or writing data in a card-shaped storage medium.

In many game arcades, players use prepaid cards for getting game media, e.g., game coins, pachinko balls. For example, in a pachinko hall, a player inserts a prepaid card into a ball lending unit, which is usually provided between adjacent pachinko machines, so as to get pachinko balls.

A conventional pachinko ball lending unit is disclosed in Japanese Patent Gazette No. 2003-30589 (see FIG. 1 and paragraphs 0025 and 0043–0045). In the lending unit, a present point datum written in a card, which corresponds to an amount of money, is read by inserting the card into a card read-writer. Then, pachinko balls are fed from a ball feeding nozzle. A number of feeding balls is within an allowable number based on the present point. When the pachinko balls are fed, the card read-writer subtracts a used point corresponding to the number of the fed balls from the present point, then writes the subtracted points in the card. By writing the subtracted point, the present point of the card is updated. If the present point left is zero, the card is discharged from an outlet, which is provided under the card read-writer, and collected in an accommodating section. With this structure, the pachinko ball lending unit can be simple and compact in size. Therefore, the lending unit can be provided in a narrow space between adjacent pachinko machines. Since the accommodating section is separated from the lending unit, volume of the accommodating section can be large so that a large number of cards can be accommodated. Further, the accommodating section can be easily opened and closed, so that cards can be easily collected.

Another conventional pachinko ball lending unit including a card processing apparatus is disclosed in Japanese Patent Gazette No. 2001-34815 (see FIG. 1 and paragraphs 0018 and 0060). In the lending unit, a card accommodating section, in which a plurality of cards can be piled, is provided in a housing. When the present point left in the card is zero, the card is accommodated in the card accommodating section. Further, the card, which has been once accommodated in the card accommodating section, can be reissued. The card accommodating section is detachably attached to the housing, so the cards in the card accommodating section can be collected by detaching the card accommodating section from the housing. If a money identification unit, which identifies money inserted therein, is connected to the lending unit, an amount of money inserted in the money identification unit is added to the present point of the card, which has been accommodated in the card accommodating section. Then, the updated card can be reissued. Namely, the card, whose present point corresponds to the money inserted in the money identification unit, can be reissued.

However, the conventional lending units have following disadvantages.

In the lending unit disclosed in Japanese Patent Gazette No. 2003-30589, the card read-writer does not issue the card. Therefore, the player cannot buy the card in cash. When the point left in the card reaches zero, the player must leave the pachinko machine so as to buy another card. Namely, the player must stop the game. Stopping the game is inconvenient for the player, and it reduces sales of the pachinko hall.

In the lending unit disclosed in Japanese Patent Gazette No. No. 2001-34815, the card can be reissued. But, the structure for accommodating and reissuing the card is very complex, so that a manufacturing cost must be high and the size of the lending unit must be large. An ordinary space between adjacent pachinko machines is 4 cm. Therefore, it is difficult to assemble the lending unit, which is capable of accommodating and reissuing cards, in such narrow space. If the space between the adjacent pachinko machines is made wider, the lending unit can be assembled therein, but all pachinko machines must be renewed with very high cost. Further, the card accommodating section having large volume cannot be provided in the narrow space. If the card accommodating section is provided between the narrow space, it accommodates about ten cards at the most (see paragraph 0060). Namely, the card accommodating section will be filled soon, and the lending unit cannot be used until the cards are removed from the card accommodating section. Therefore, employees must frequently collect cards, and sales of the pachinko hall will be reduced. Further, the card accommodating section must be detached from the housing when cards are removed therefrom, so it is difficult to collect cards in a short time.

SUMMARY OF THE INVENTION

The present invention has been invented to solve the disadvantages of the conventional lending units.

An object of the present invention is to provide a compact and simple card processing apparatus capable of reissuing a card-shaped storage medium, which has been once accommodated in the apparatus, and omitting a trouble of collecting accommodated card-shaped storage media.

To solve the disadvantages, the present invention has following structures.

Namely, the card processing apparatus of the present invention comprises:

a body proper having a card inlet, from which a card-shaped storage medium is inserted, a card feeding path communicating to the card inlet, a card accommodating section communicating to the card feeding path and accommodating card-shaped storage media, and a card outlet communicating to the card feeding path;

means for feeding the card-shaped storage medium, which has been inserted from the card inlet, to the card accommodating section, outside of the card inlet or outside of the card outlet via the card feeding path;

means for processing the card-shaped storage medium, the processing means being located at a read-write position on the card feeding path, the processing means reading data from and writing data in the card-shaped storage medium;

means for transferring the card-shaped storage medium, which has been accommodated in the card accommodating section, to the read-write position one by one;

a movable guide section distributing the card-shaped storage medium to the card accommodating section or the card outlet according to a position thereof;

means for changing the position of the movable guide section; and a control section controlling the changing means and the feeding means on the basis of data, which have been read from or written in the card-shaped storage medium located at the read-write position, so as to selectively feed the card-shaped storage medium to the card accommodating section, outside of the card inlet or outside of the card outlet. With this structure, the transferring means transfers the card-shaped storage medium from the card accommodating section, the processing means writes new data in the card-shaped storage medium, and the feeding means moves the card-shaped storage medium storing the new data to outside of the card inlet, so that the card-shaped storage medium can be reissued. Since the card-shaped storage medium, which has been inserted in the card inlet, is selectively fed to the card accommodating section, outside of the card inlet or outside of the card outlet, the new card-shaped storage medium can be discharged to outside of the card outlet even if the card accommodating section is filled with the card-shaped storage media. Therefore, the trouble of removing the card-shaped storage media from the card accommodating section can be omitted. Since the card processing apparatus has a simple structure, it can be compact in size and provided between a narrow space between game machines.

In the card processing apparatus, the movable guide section may be a plate. With this structure, a structure of the movable guide section can be simple.

In the card processing apparatus, the movable guide section may be capable of turning about a shaft, which is perpendicular to a feeding direction of the card-shaped storage medium along the card feeding path, and the movable guide section may distribute the card-shaped storage medium to the card accommodating section or the card outlet according to a tuning angle thereof.

In the card processing apparatus, the card outlet and the card accommodating section may be arranged side by side, and the movable guide section may be provided between the card accommodating section and the card outlet. Further, the movable guide section may act as a partition separating the card accommodating section and the card outlet. With these structures, the simple and small size apparatus can be realized.

In the card processing apparatus, the movable guide section may have a projected portion projecting toward the card accommodating section so as to contact the card-shaped storage medium, which has been accommodated in the card accommodating section, and form a space, through which another card-shaped storage medium can be inserted, between the movable guide section and the card-shaped storage medium, which has been already accommodated in the card accommodating section. With this structure, new card-shaped storage media can be smoothly fed into the card accommodating section via the space.

In the card processing apparatus, a card restraining section may be provided to a card introducing end of the movable guide section so as to form a space, through which one card-shaped storage medium can pass, between the card restraining section and a surface of the movable guide section on the card accommodating section side. With this structure, only one card-shaped storage medium can be securely fed from the card accommodating section to the feeding path.

In the card processing apparatus, the transferring means may have a pusher contacting one of the card-shaped storage media accommodated in the card accommodating section and moving the same to a position, at which the feeding means is capable of feeding, and the feeding means may move the card-shaped storage medium, which has been moved by the pusher, to the read-write position. With this structure, the card-shaped storage medium can be moved from the card accommodating section to the read-write position by the simple pusher and the feeding means.

In the card processing apparatus, the card-shaped storage medium located at the read-write position may correspond to the movable guide section. With this structure, the size of the apparatus in the card feeding direction can be short, so that the apparatus can be small in size.

In the card processing apparatus, the feeding means may include driving rollers and pinch rollers, which pinch the card-shaped storage medium from both sides. With this structure, the card-shaped storage medium can be stably fed.

In the card processing apparatus, the driving roller and the pinch roller may correspond to the movable guide section, and the movable guide section may have a notch for avoiding an interference with the driving roller and the pinch roller corresponding thereto. With this structure, even if the card-shaped storage medium corresponds to the guide section (until a rear end of the card-shaped storage medium passes an end of the guide section), the card-shaped storage medium is pressed onto the rollers and can be securely moved to the card accommodating section or outside of the card outlet.

In the card processing apparatus, a the control section may guide a forward end of the card-shaped storage medium toward the card accommodating section and make the movable guide section move toward the card accommodating section so as to press the card-shaped storage medium onto the driving roller and the pinch roller located on the card accommodating section side when the card-shaped storage medium is fed to the card accommodating section. With this structure, the card-shaped storage medium can be securely pressed onto the rollers on the card accommodating section side, so that the card-shaped storage medium can be securely fed to the card accommodating section. Especially, the rear end of the card-shaped storage medium contacts the card accommodating section side of the rollers, so that the card-shaped storage medium can be securely fed to an inner part of the card accommodating section.

The card processing apparatus may further comprise a card collecting storage, which is communicated to the card outlet and which is capable of collecting the card-shaped media discharged from the card outlet. With this structure, size and volume of the card collecting storage can be freely designed. A large number of the card-shaped storage media can be accommodated and easily collected.

In the card processing apparatus, each of the card-shaped storage media may store a datum of value, the processing means may read the amount of money from the card-shaped storage media, subtract a consumed value from the read value, and replace the value with the subtracted value, the control section may feed the card-shaped storage medium to outside of the card inlet if the subtracted value is not zero when using the card-shaped storage medium is completed, the control section may feed the card-shaped storage medium to the card accommodating section if the subtracted value is zero and the card accommodating section is not filled with the card-shaped storage media when using the card-shaped storage medium is completed, and the control section may feed the card-shaped storage medium to outside of the card outlet if the subtracted value is zero and the card accommodating section is filled with the card-shaped storage media when using the card-shaped storage medium is completed.

With this structure, the card-shaped storage medium, whose value is zero, can be accommodated in the card accommodating section and can be reissued. Further, if the maximum number of accommodating the media is greater than an estimated number of reissuing media, the cards exceeding the estimated number can be discharged outside from the card outlet.

In the card processing apparatus, a money identification unit, which is capable of identifying money inserted thereto, may be connected, the control section may move one card-shaped storage medium from the card accommodating section to the read-write position by the transferring means if no card-shaped storage medium is located at the read-write position when the money identification unit identifies money, and the processing means may add a value of the money, which has been identified by the money identification unit, to the value, which has been read from the card-shaped storage medium located at the read-write position, and replace the value with the added value.

With this structure, the value can be newly written in the card-shaped storage medium, whose value was zero and accommodated in the card accommodated section, and reissued via the card inlet.

BRIEF DESCRIPTION OF THE DRAWINGS

Embodiments of the present invention will now be described by way of examples and with reference to the accompanying drawings, in which:

FIG. 9A is an explanation view, in which the movable guide section guides the card-shaped storage medium toward the card accommodating section;

FIG. 9B is an explanation view, in which the movable guide section guides a front end of the card-shaped storage medium toward the card accommodating section;

FIG. 9C is an explanation view, in which the movable guide section presses the card-shaped storage medium onto driving rollers (a timing belt) and guides the same toward the card accommodating section.

DETAILED DESCRIPTION OF THE EMBODIMENTS

Preferred embodiments of the present invention will now be described in detail with reference to the accompanying drawings.

Figure 1:
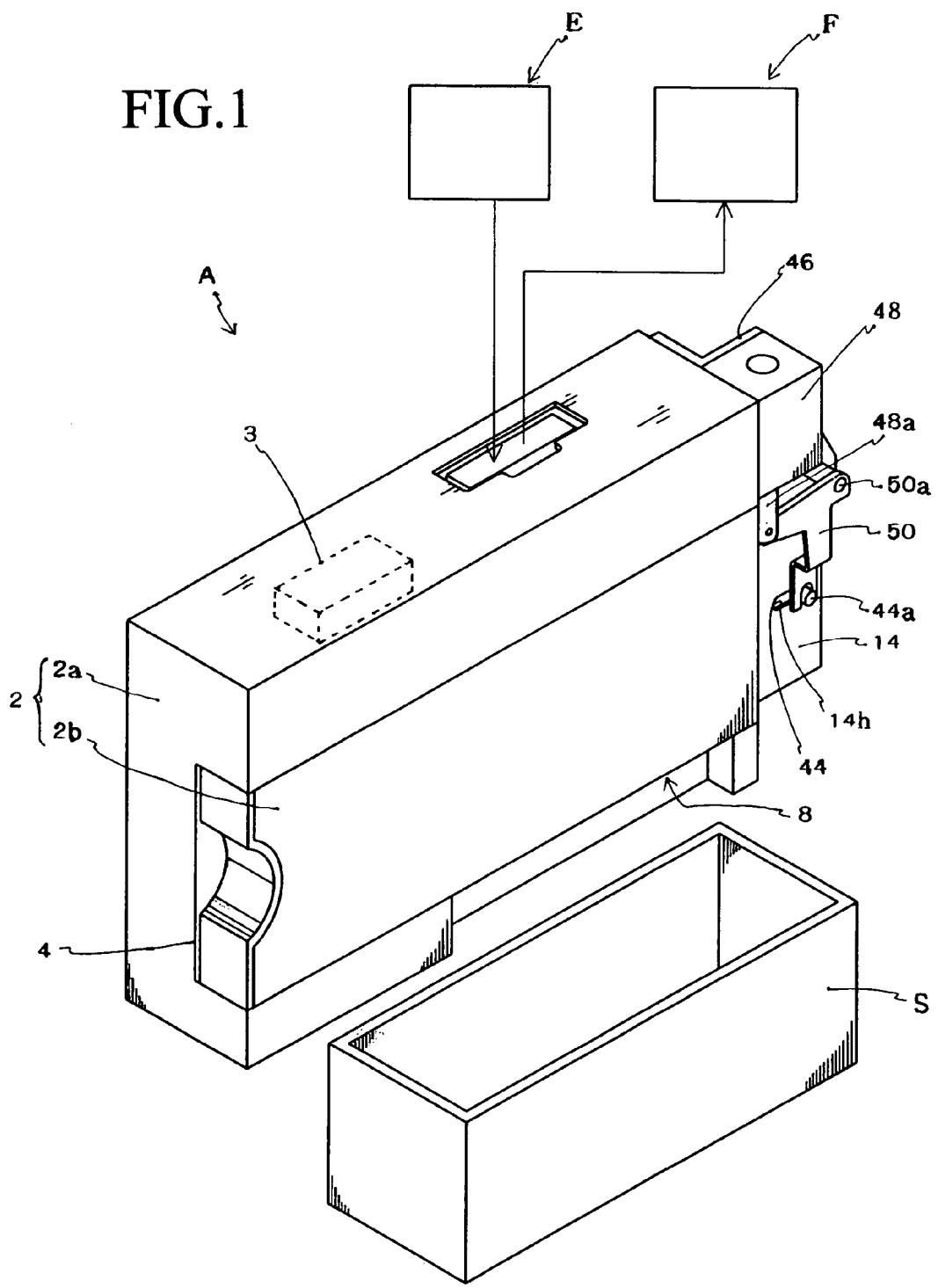
FIG. 1 is a perspective view of a card processing apparatus of an embodiment of the present invention.

FIG. 1 is a perspective view of a card processing apparatus of an embodiment of the present invention.

As shown in FIG. 1, a body proper 2 of the card processing apparatus A includes a chassis 2a and a door member 2b, which is capable of fitting to an opening part in one side of the chassis 2a and opening and closing the opening part. The body proper 2 is formed into a rectangular parallelepiped. The body proper 2 has a card inlet 4, from which a card-shaped storage medium C (hereinafter referred to as "card C"), e.g., IC card, in inserted, and a card outlet 8, which is communicated to the card inlet 4 via a card feeding path 6 (see FIGS. 2 and 3). The card outlet 8 is opened downward. In the case of closing the door member 2b, the card inlet 4, the feeding path 6 and the card outlet 8 are formed, and their width are slightly wider than thickness of the card C. The card C can be conveyed to the card outlet 8 via the feeding path 6.

A card collecting storage S is provided under the card outlet 8. Cards C discharged from the card outlet 8 are collected in the card collecting storage S.

Terminals 34 are formed in an outer face of the body proper 2. The card processing apparatus A can be electrically connected to an external apparatus E, e.g., money identification unit. Transmitting and receiving signals are controlled by a control section 3, which is assembled in the body proper 2. The control section 3 includes a CPU, memories, etc. and executes programs stored in the memories.

Figure 2:
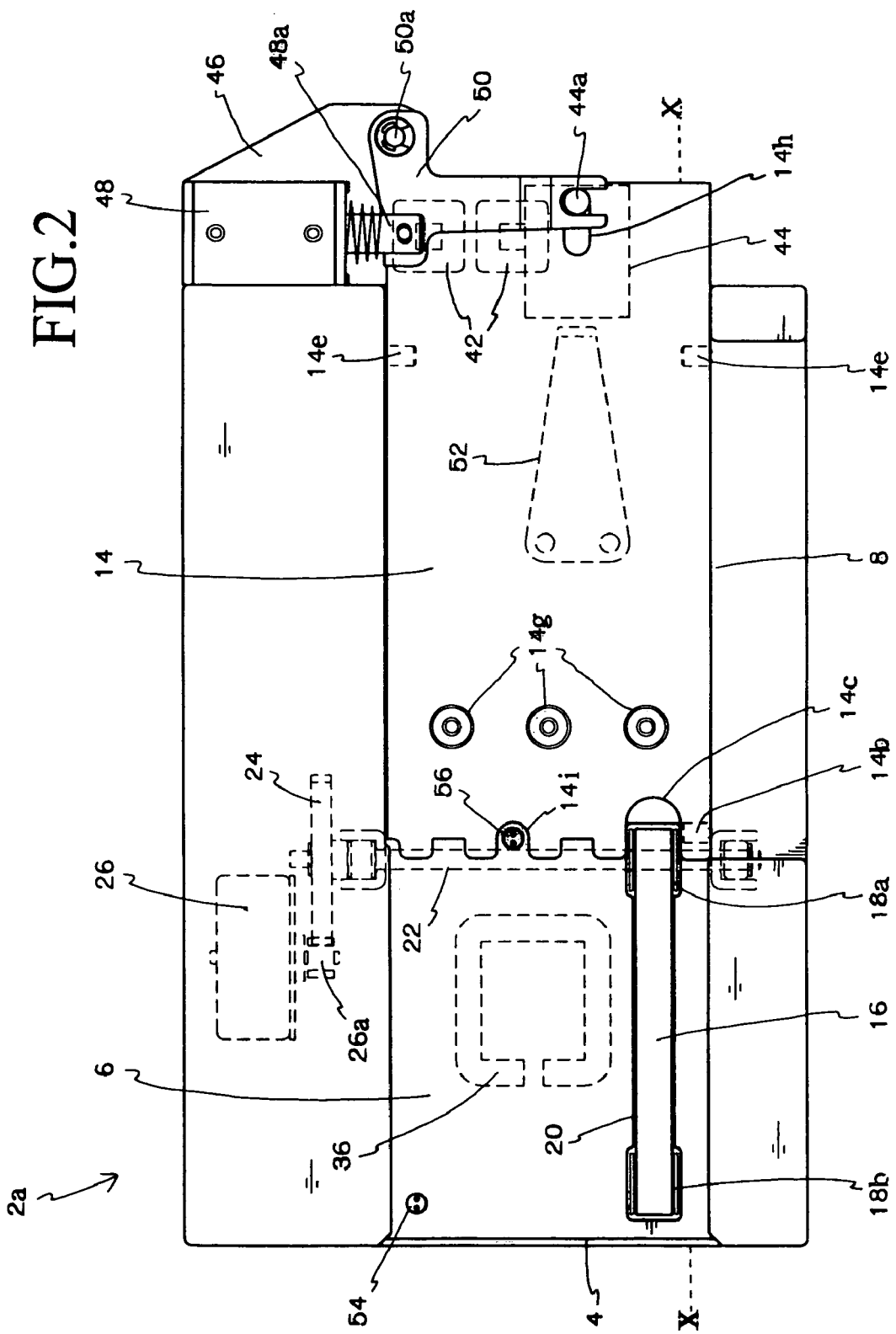
FIG. 2 is a side view of the card processing apparatus.
Figure 3:
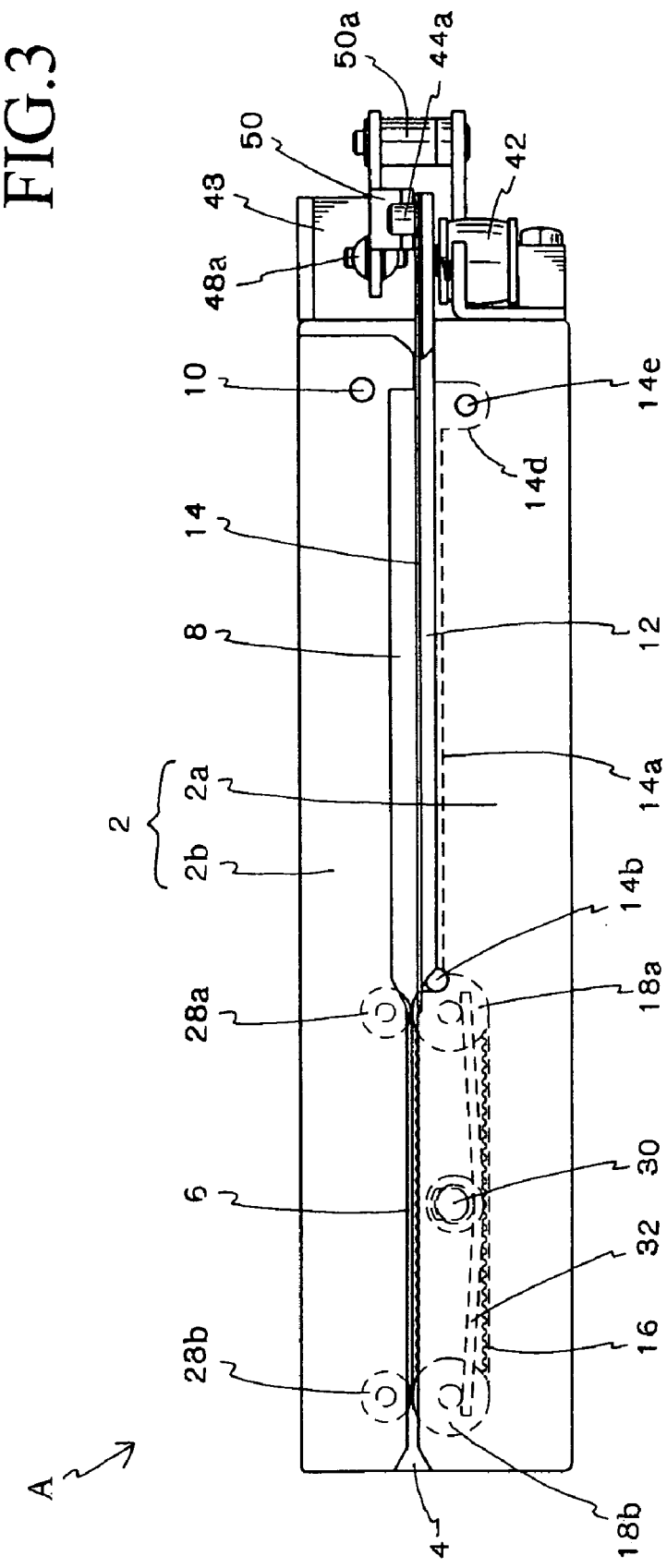
FIG. 3 is a sectional view of the card processing apparatus taken along a line X—X of FIG. 2 seen from a lower side.
Figure 4:
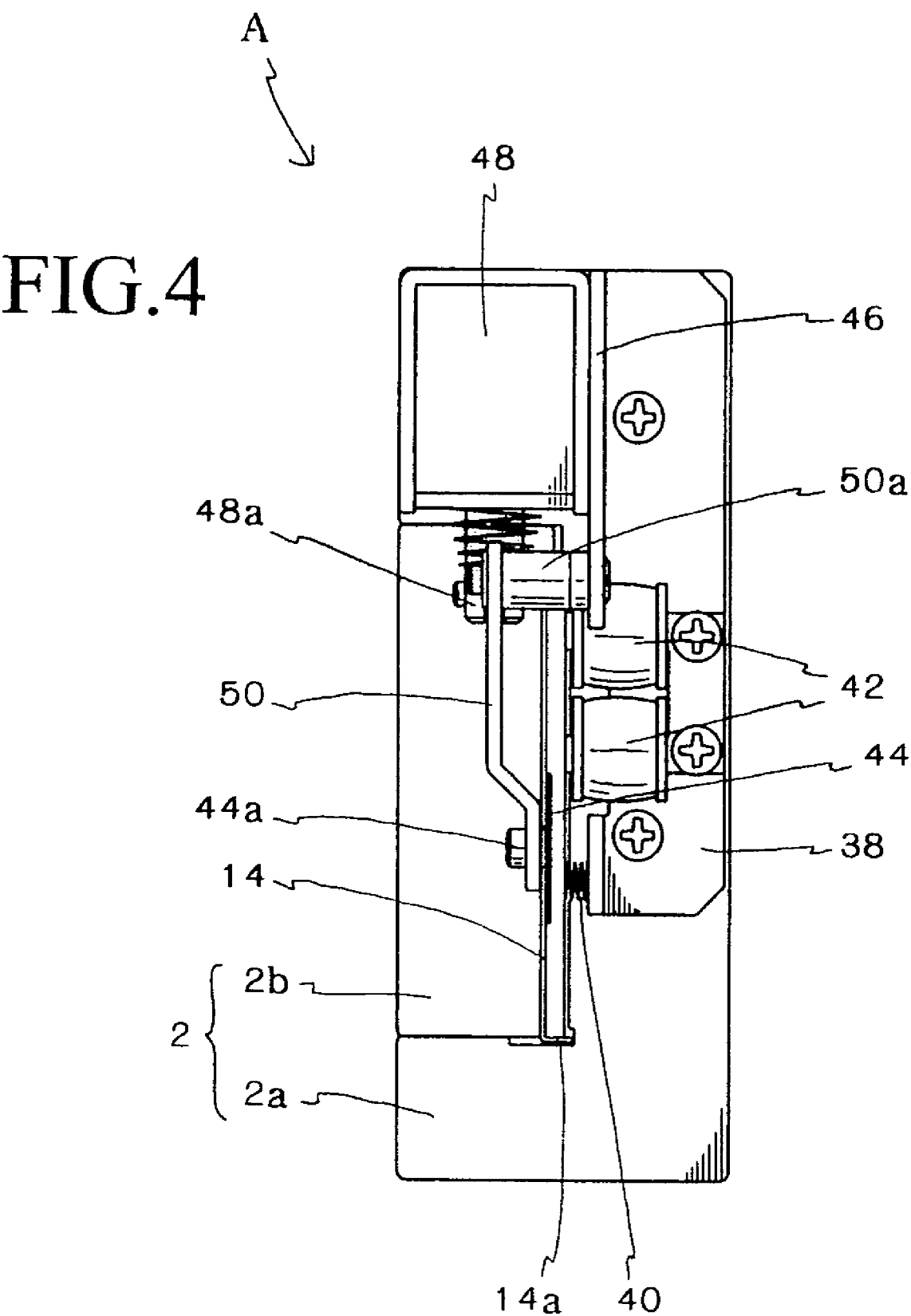
FIG. 4 is an explanation view of the card processing apparatus.

The structure of the card processing apparatus A is shown in FIGS. 2–4.

FIG. 2 is a side view of the chassis 2a without the door member 2b. Elements not seen from outside of the chassis 2a are shown by dotted lines.

FIG. 3 is a sectional view of the body proper 2 taken along a line X—X of FIG. 2 seen from a lower side.

FIG. 4 is an explanation view of the body proper 2 seen from a left side.

Note that, in FIGS. 3 and 4, the door member 2b is attached to the chassis 2a.

As shown in FIG. 3, the door member 2b is pivotably attached to the chassis 2a with a shaft 10, so that the door member 2b is capable of opening and closing the chassis 2a. A latch mechanism (not shown) for locking the door member 2b is provided to the body proper 2, on the opposite side of the shaft 10.

As shown in FIG. 2, the feeding path 6 is communicated to the card inlet 4 and extended inward (rightward in FIG. 2). An inner end of the feeding path 6 reaches the card outlet 8, which is opened downward.

As shown in FIG. 3, the card outlet 8 is formed between a wall of the feeding path 6 on the door member 2b side and a guide plate 14, which acts as a movable guide section.

A space, which act as a card accommodating section 12, is formed on the opposite side of the card outlet 8 with respect to the guide plate 14. Namely, the card accommodating section 12 is formed between the guide plate 14 and a wall of the chassis 2a. Width of the card accommodating section 12 is equal to total thickness of several cards C. In the present embodiment, the width is equal to the total thickness of six cards C.

The card outlet 8 and the card accommodating section 12 are arranged side by side, and the guide plate 14 is provided between the card outlet 8 and the card accommodating section 12 as a partition.

Means for feeding the card C will be explained.

In FIG. 2, a rectangular opening 20, which extends in the card feeding direction, is formed in a side wall of the chassis 2a, which constitutes one side wall of the feeding path 6. Pulleys 18a and 18b are respectively provided to both ends of the opening 20, and a timing belt 16 is engaged with the pulleys 18a and 18b. The timing belt 16 is slightly projected form the opening 20 toward the feeding path 6. The pulley 18a on the inner side of the feeding path 6 is rotatably attached to the chassis 2a with a shaft 22. A beg gear 24 is fixed to one end of the shaft 22, and the big gear 24 is engaged with a pinion 26a, which is fixed to a motor shaft of a stepping motor 26. The stepping motor 26 acts as a driving source of the feeding means.

By rotating the stepping motor 26, the pulley 18a, which acts as a driving roller, is rotated, so that the timing belt 16 is moved along the feeding path 6.

In FIG. 3, pinch rollers 28a and 28b, which respectively correspond to the pulleys 18a and 18b, are provided to a side wall of the door member 2b, which faces the one side wall of the feeding path 6. The pinch rollers 28a and 28b are slightly projected toward the feeding path 6.

Shafts of the pulleys 18a and 18b are always biased toward the pinch rollers 28a and 28b by a torsion spring 32. With this structure, the timing belt 16 is pinched between the pulleys 18a and 18b and the pinch rollers 28a and 28b. The torsion spring 32 is held by a holding member 30, which is fixed in the chassis 2a.

By pressing the timing belt 32 to the pinch rollers 28a and 28b with the pulleys 18a and 18b, the pinch rollers 28a and 28b are rotated with the rotation of the pulleys 18a and 18b and the motion of the timing belt 16.

Note that, in the present embodiment, the pulleys 18a and 18b are biased toward the pinch rollers 28a and 28b. In another embodiment, the pinch rollers 28a and 28b may be biased toward the pulleys 18a and 18b.

Start, stop and rotational directions of the stepping motor 26 are controlled by the control section 3. With this control, action of the pulleys 18a and 18b, the timing belt 16 and the pinch rollers 28a and 28b are also controlled.

In the present embodiment, the card feeding means is constituted by the stepping motor 26, the pinion 26a, the big gear 24, the shaft 22, the pulleys 18a and 18b, the timing belt 16 and the pinch rollers 28a and 28b.

Next, means for processing the card C will be explained.

In FIG. 2, a coil-shaped antenna 36 is provided in the side wall of the feeding path 6. The antenna 36 reads data from and writes data in the card C as a card read-writer. Data read by the antenna 36 are sent to the control section 3; the control section 3 writes data in the card C by the antenna 36. The processing means is constituted by the antenna 36, etc.

Figure 5:
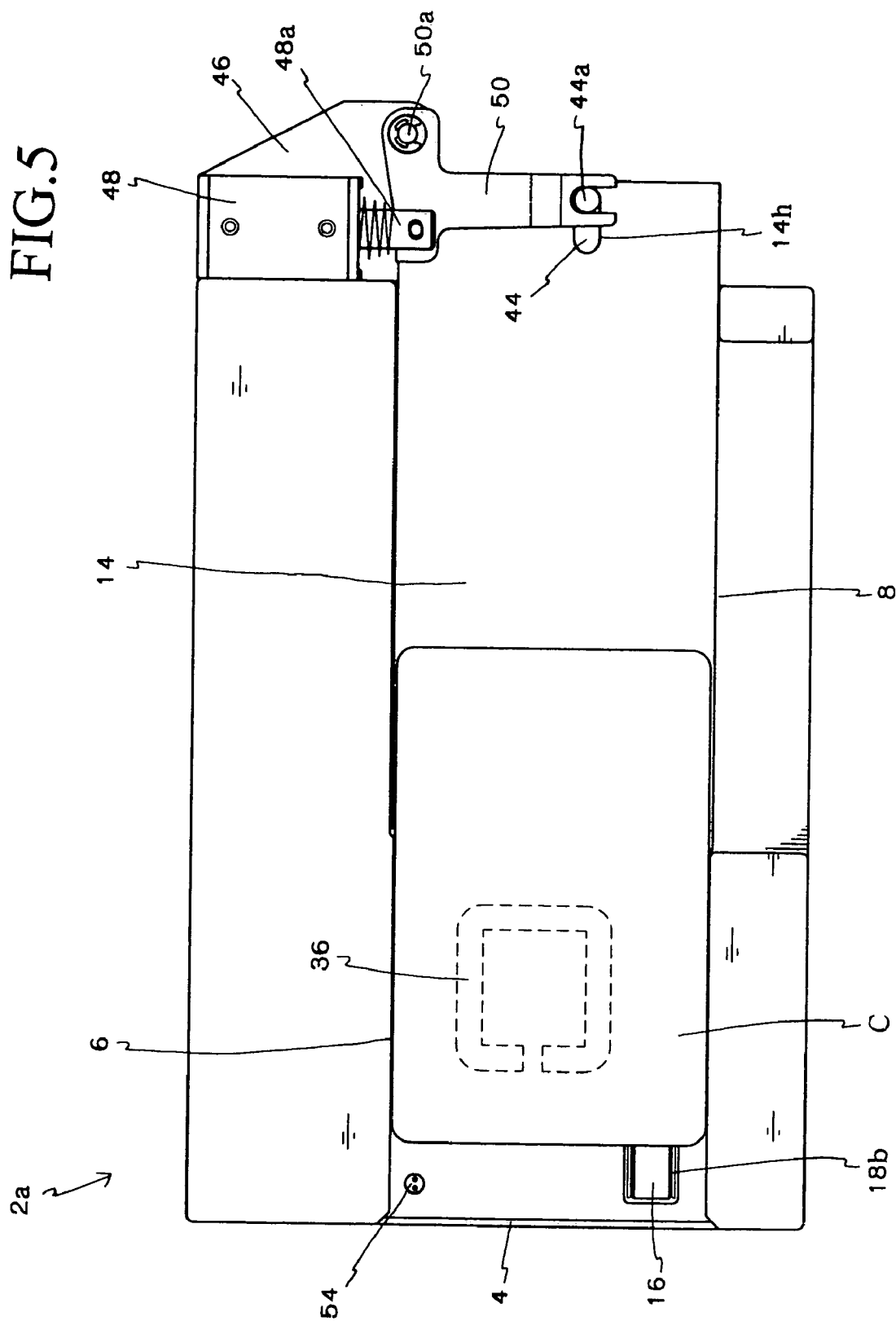
FIG. 5 is an explanation view showing a read-write position.

FIG. 5 is an explanation view showing a read-write position, at which the control section 3 can read data from and writes data in the card C. In the present embodiment, a front part (an inner part) of the card C corresponds to a card outlet 8 side part of the guide plate 14 at the read-write position.

Next, the guide plate 14, which acts as the movable guide section, will be explained.

Figure 6A:
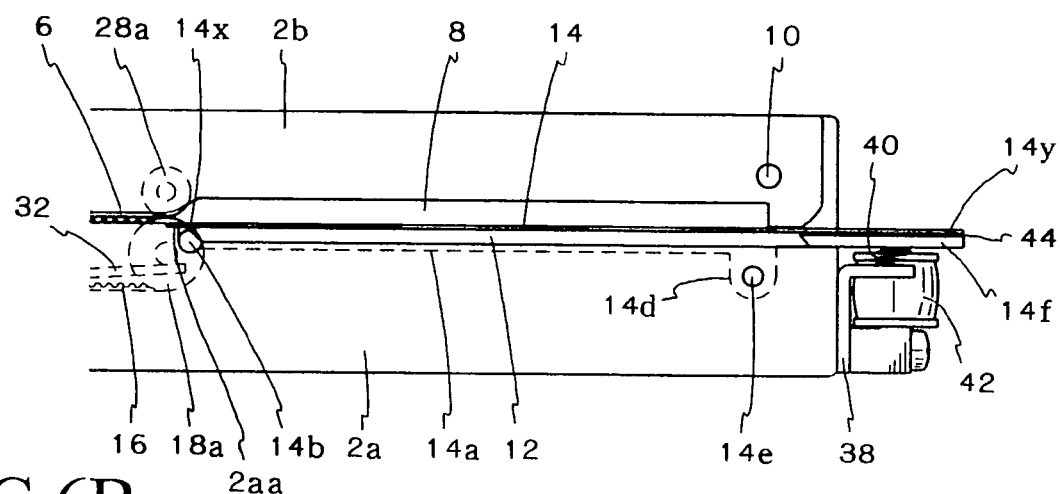
FIG. 6A is an explanation view, in which a movable guide section guides a card-shaped storage medium toward a card outlet.
Figure 6B:
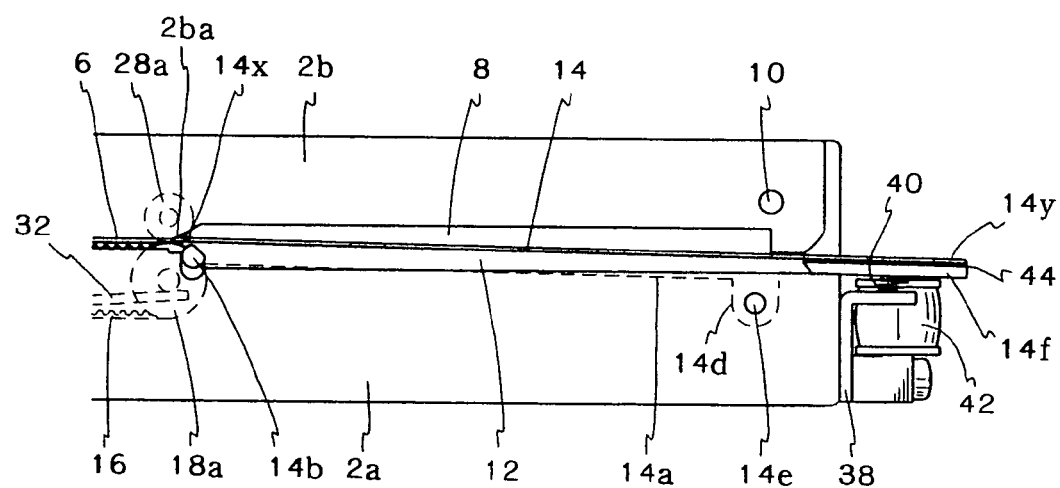
FIG. 6B is an explanation view, in which the movable guide section guides the card-shaped storage medium toward a card accommodating section.

FIGS. 6A and 6B are schematic sectional views of the guide plate 14 taken along the line X—X of FIG. 2 seen from the lower side. Note that, the door member 2b is shown in FIGS. 6A and 6B. As shown in FIG. 6A, the guide plate 14 is provided in parallel to the surface of the card C fed on the feeding path 6. As described above, the guide plate 14 acts as the partition between the card outlet 8 and the card accommodating section 12.

Figure 7:
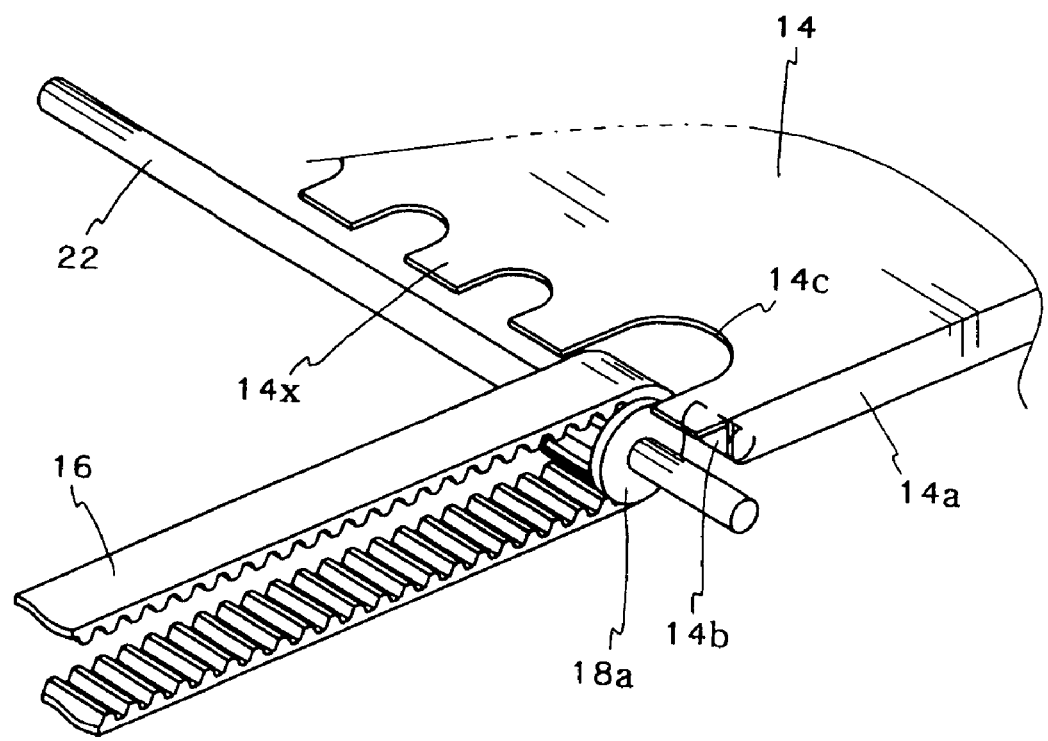
FIG. 7 is an enlarged view of a card introducing end of the movable guide section.

FIG. 7 is an enlarged view of a card introducing end 14x of the guide plate 14. Bent sections 14a are formed along upper and lower edges of the guide plate 14, which are extended in the card feeding direction. The bent section of the upper edge is not shown in FIG. 7. The bent sections 14a are bent at right angle. Namely, a transverse sectional shape of the guide plate 14 with respect to the card feeding direction is formed into a U-shape. Grooves (not shown), which are capable of accommodating the bent sections 14a, are formed in the side wall of the card accommodating section 12, which faces the guide plate 14.

A cylindrical restraining pin 14b is provided at the end 14x of the guide plate 14. The restraining pin 14 is extended upward from the bent section 14a. By the restraining pin 14b, a space is formed between the restraining pin 14b and the surface of the guide plate 14 on the card accommodating section 12 side. Width of the space is wider than the thickness of one card C and narrower than total thickness of two cards C. Namely, only one card C can passes through the space.

As shown in FIGS. 6A and 6B, the restraining pin 14b has a flat face, which is formed on the card accommodating section 12 side. By forming the flat face, the card C can be smoothly introduced to the space between the restraining pin 14b and the surface of the guide plate 14 when the card C is introduced to outside of the card accommodating section 12. A distance between one edge of the flat face and the guide plate 14 is made minimum, so that the flat face is diagonally formed toward the card accommodating section 12. The flat face is designed to accommodate the restraining pin 14b in a cylindrical space, which is extended from an outer edge of the pulley 18a in the axial direction thereof, when the end 14x of the guide plate 14 contacts a receive section 2aa of the side wall of the card accommodating section 12.

Further, as shown in FIG. 7, the end 14x of the guide plate 14 corresponds to the pulley 18a and the pinch roller 28a (not shown in FIG. 7). A notch 14c is formed in the end 14x of the guide plate 14 so as to avoid interference with the pulley 18a and the pinch roller 28a.

As shown in FIGS. 6A and 6B, extended sections 14d are partially extended from the upper and the lower bent sections 14a. The extended sections 14d are formed nearer to the other end 14y of the guide plate 14. A shaft 14e is pierced through the extended sections 14d. The shaft 14e is arranged in parallel to the surface of the card C and perpendicular to the card feeding direction. The guide plate 14 can be turned about the shaft 14e.

The end 14y of the guide plate 14, which is on the outer side of the shaft 14e, is projected outward from the body proper 2. The end 14y of the guide plate 14 is always biased toward the card outlet 8 (upward in FIG. 6A) by a spring 40, which is provided on a holding member 38 fixed to the chassis 2a. Therefore, the end 14x of the guide plate 14 is always biased toward the card accommodating section 12 (downward in FIG. 6A). The end 14x of the guide plate 14 contacts the receive section 2aa of the side wall of the chassis 2a, which constitutes the feeding path 6, so that the motion of the end 14x is restrained.

Next, means for changing the position of the guide plate 14 will be explained.

An electromagnet 42 is provided to a holding member 38. In FIG. 6A, the electromagnet 42 is provided on the inner side of the holding member 38. The control section 3 turns on and off the electromagnet 42.

When the control section 3 turns on the electromagnet 42, the electromagnet 42 draws the end 14y of the guide plate 42, which is made of a magnetizable material, e.g., iron, toward the card accommodating section 12 (downward in FIG. 6A) against the elasticity of the spring 40. With this action, the end 14x of the guide plate 14 is moved toward the car outlet 8 (upward in FIG. 6B) as shown in FIG. 6B, then the end 14x contacts a receive section 2ba of the side wall of the door member 2b, which constitutes the feeding path 6.

On the other hand, when the control section 3 turns off the electromagnet 42, the guide plate 14 is released from the magnetic force of the electromagnet 42, so that the end 14y of the guide plate 14 is moved toward the card outlet 8 (upward in FIG. 6B) by the elasticity of the spring 40; the end 14x of the guide plate 14 is moved toward the card accommodating section 12 (downward in FIG. 6B) and contacts the receive section 2aa, so that the guide plate 14 returns to the position shown in FIG. 6A.

The changing means is constituted by the spring 40 and the electromagnet 42.

In the present embodiment, a magnetizable plate 14f, which is made of a magnetizable material, e.g., iron, and whose thickness is thicker than that of the guide plate 14, is attached to the end 14y so as to effectively draw the guide plate 14 toward the electromagnet 42.

A kick plate 44 is provided between the main part of the guide plate 14 and the magnetizable plate 14f.

Projected sections 14g are projected toward the card accommodating section 12 from the guide plate 14 (see FIGS. 2 and 9). The projected sections 14g are located nearer to the end 14x of the guide plate 14. The projected sections 14g contact the card C, which has been accommodated in the card accommodating section 12, when a new card C is newly accommodated in the card accommodating section 12. With this action, a space, into which the new card C can enter, can be formed over the accommodated card C.

As shown in FIGS. 9A–9C, a leaf spring 52 presses a front (an inner) end of the card C, which is accommodated in the card accommodating section 12, onto the guide plate 14. One end of the leaf spring 52 is fixed to the side wall of the chassis 2a, which separates the card accommodating section 12; the other end is extended toward the inner part of the card accommodating section 12 and biases the card C toward the guide plate 14.

Next, the kick plate 44, which constitutes means for transferring the card C, will be explained.

As shown in FIGS. 9A–9C, the kick plate 44 is a flat plate and slightly thinner than the card C. The kick plate 44 is provided to the end 14y of the guide plate 14 and between the surface of the guide plate 14, which is on the card accommodating section 12 side, and the magnetizable plate 14f.

A pin 44a is perpendicularly extended from a surface of the kick plate 44. As shown in FIG. 2, the pin 44a is pierced through a long groove 14h of the guide plate 14, which is formed in the card feeding direction. With this structure, the kick plate 44 is capable of sliding, on the surface of the guide plate 14, which is on the card accommodating section 12 side, in the card feeding direction.

In FIG. 2, the pin 44a fixed to the kick plate 44 is engaged with a lever 50, which is rotatably attached by a shaft 50a. By turning the lever 50, the pin 44a is reciprocally moved in the card feeding direction. A solenoid unit 48 is fixed on a base section 46 integrated with the chassis 2a. A movable plunger 48a of the solenoid unit 48 turns the lever 50. The control section 3 controls the solenoid unit 48.

As shown in FIG. 2, photo sensors 54 and 56 for detecting insertion and conveyance of the card C are provided in the side wall of the chassis 2a, which constitutes the feeding path 6. The photo sensor 54 is located near the card inlet 4; the photo sensor 56 is located near the card introducing end 14x of the guide plate 14. The photo sensor 56 detects the card C through another notch 14i of the guide plate 14. Detection signals of the photo sensors 54 and 56 are sent to the control section 3.

Successively, action of the card processing apparatus A will be explained.

In the present embodiment, the card processing apparatus A is included in a ball lending system of a pachinko hall and assembled between adjacent pachinko machines. The money identification unit E is connected to the terminals 34, so that signals sent from the money identification unit E, which indicate amount of inserted money, e.g., coins, are sent to the control section 3 (see FIG. 1). Further, the control section 3 sends commands to a ball lending unit F (see FIG. 1) so as to supply assigned number of balls to a player.

The card C stores data of value, e.g., amount of money, number of lendable pachinko balls.

The data of value may directly indicate an amount of money or number of lendable pachinko balls. Further, the data may indicate an identification number of the card C.

In the present embodiment, an amount of money is stored in the card C as the data of value.

Note that, in the case of storing the identification number of the card C as the data of value, data of amount of money corresponding to the card C are stored in a host computer of the pachinko hall. The ball lending unit F is connected to the host computer, and the computer is capable of updating the data of amount of money corresponding the card C.

Successively, action of the card processing apparatus A will be explained.

When the player insets the card C into the card processing apparatus A from the card inlet 4, the photo sensor detects the card C (see FIG. 2). The control section 3 controls the stepping motor 26 so as to drive the timing belt 16 in the card feeding direction (toward the inner part of the card feeding path 6). The card C is pinched between the pinch rollers 28a and 28b and the timing belt 16 and fed along the card feeding path 6.

When the guide plate 14 is located at an initial position, no electric current passes through the electromagnet 42. Therefore, the end 14x of the guide plate 14 is biased by the elasticity of the spring 40 and contacts the receive section 2aa of the side wall on the card accommodating section 12 side. This position is the initial position (see FIG. 6A). In this state, if the card C is fed to the read-write position (see FIG. 5), the front end (the forward end) of the card C is moved forward along the surface of the guide plate 14 on the card outlet 8 side.

When the photo sensor 56 (see FIG. 2) detects the front end of the card C, the control section 3 controls a rotational angle of the motor 26 or number of stepping the motor 26 so as to correctly position the card C at the read-write position. Note that, a DC motor may be employed instead of the stepping motor 26. In this case, a rotary encoder may be used to correctly position the card C.

The control section 3 reads the data of amount of money from the card C by the antenna 36 and sends a command of lending balls to the ball lending unit F. The ball lending unit F lends pachinko balls of the lendable number to the player.

Then, the control section 3 subtracts a consumed amount of money from the amount of money, which has been read from the card C. The control section 3 rewrites the subtracted amount of money in the card C by the antenna 36. Therefore, the amount of money stored in the card C is replaced with the subtracted amount of money. Namely, the card C can be updated.

When the player finishes the game, if the subtracted amount of money is not zero, the control section 3 feeds the card C to outside of the card inlet 4. The card processing apparatus A returns the card C to the player. In this action, the stepping motor 26 is rotated in the reverse direction to drive the timing belt 16 in the reverse direction.

When the player finishes the game, if the subtracted amount of money is zero, the control section 3 feeds the card C to the card accommodating section 12 or the card collecting storage S. By accommodating or collecting the used card C whose amount of money is zero, illegal renew of the card C can be prevented, and the card C can be reused. Further, the control section 3 checks if the card accommodating section is filled with the card C or not. In the present embodiment, the card accommodating section 12 can accommodate six cards C. The control section 3 counts the present number of the cards C. The counting action is executed by incrementing and decrementing number of a memory counter. If the card accommodating section 12 is full-filled, the control section 3 fed the card C, which has been newly inserted in the card processing apparatus A, to the card outlet 8 and collect the same in the collecting storage S. On the other hand, if the card accommodating section 12 is not full-filled, the control section 3 accommodates the card C, which has been newly inserted in the card processing apparatus A, in the card accommodating section 12 and increments the number of the memory counter.

Note that, the maximum number of accommodating the cards C in the card accommodating section 12 may be equal to or less than an accommodatable number of the card C. Therefore, when the card accommodating section 12 is full-filled with the cards C, the determined maximum number of the cards C are in the card accommodating section 12. The maximum number of accommodating the cards C is not always equal to the accommodatable number.

Figure 8:
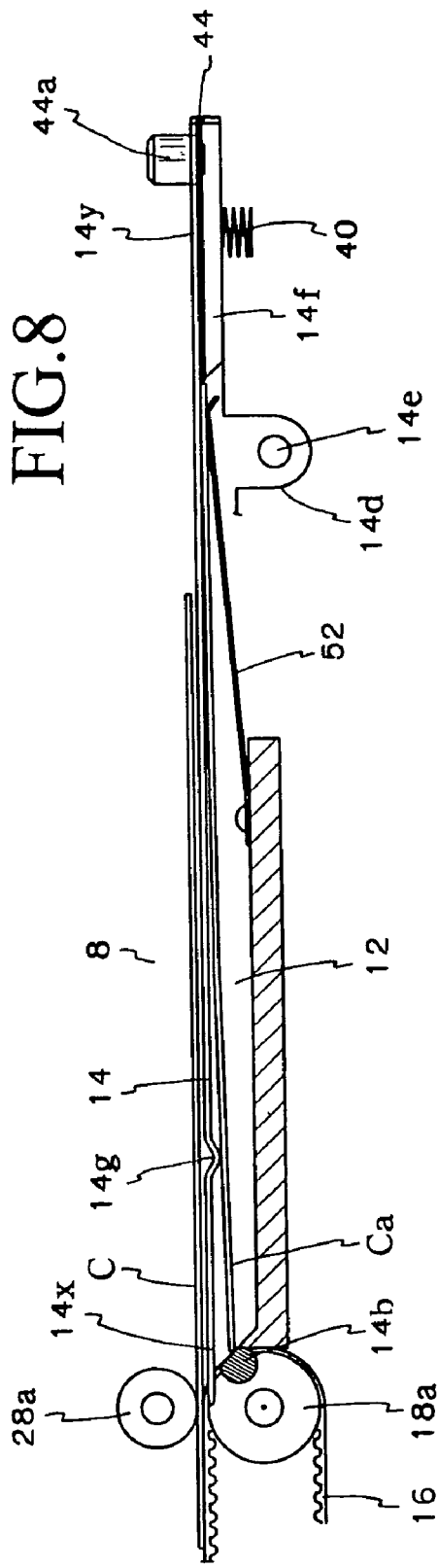
FIG. 8 is an explanation view, in which the movable guide section guides the card-shaped storage medium toward the card outlet.

When the card C is discharged from the card outlet 8, the control section 3 controls the stepping motor 26 so as to move the timing belt 16 forward (toward the card outlet 8). The card C is conveyed toward the inner part of the card feeding path 6 (toward the card outlet 8) via the position shown in FIG. 8. When the rear end of the card C passes through the timing belt 16 (or the pulley 18a and the pinch roller 28a), the card C falls into the card collecting storage S via the card outlet 8. The card C is collected in the storage S.

Next, the action of feeding the card C into the card accommodating section 12 will be explained.

The read-write position, at which the card C is read and written, is shown in FIG. 5. As shown in FIG. 5, the front end of the card C corresponds to a part of the guide plate 14 located on the card outlet 8 side.

To introduce the card C into the card accommodating section 12, the control section 3 once returns the card C to a position short of a dividing position, at which the card C is divided by the guide plate 14, then the control section 3 changes the position of the guide plate 14 so as to feed the card C into the card accommodating section 12, which is located on the opposite side with respect to the guide plate 14.

Namely, firstly the control section 3 controls the stepping motor 26 so as to convey the card C toward the card inlet 4 until the inner end of the card C reaches a position on the card inlet 4 side of the end 14x of the guide plate 14, which is the position short of the dividing position.

Next, the control section 3 makes an electric current pass through the electromagnet 42 so as to change the position of the guide plate 14. With this action, the end 14x of the guide plate 14 contacts the receive section 2ba of the side wall on the card outlet 8 side (see FIG. 6B). An inner end of a card Ca, which has been already accommodated in the card accommodating section 12, is pressed onto the guide plate 14 by the elasticity of the leaf spring 52, and the projected portions 14g of the guide plate 14 contact an introducing end of the card accommodating section 12 (see FIG. 9A). Therefore, in the vicinity of the introducing end of the card accommodating section 12, a space 58 is formed between the guide plate 14 and the card Ca. Then, the control section 3 controls the stepping motor 26 to feed the card C forward (toward the inner part of the card feeding path 6), so that the front end of the card C is guided, by the guide plate 14, to enter the card accommodating section 12 (see FIG. 9B). At that time, the card C enters the space 58. Unless the projected portions 14g and the leaf spring 52 are provided, the card Ca is not stable in the card accommodating section 12, so that the card C is interfered with the card Ca. Namely, it is difficult to smoothly introduce the card C into the card accommodating section 12.

After the front end of the card C is introduced toward the card accommodating section 12, the control section 3 stops the electric current passing thorough the electromagnet 42 so as to move the end 14x of the guide plate 14 toward the card accommodating section 12. With this action, the guide plate 14 presses the card C onto the pulley 18a, which acts as the driving roller, by the timing belt 16 on the card accommodating section 12 side. Therefore, the timing belt 16 is capable of properly pressing the card C, from the front end to the rear end, onto the pulley 18a, so that the card 12 can be completely accommodated in the card accommodating section 12.

Since the pulley 18a and the pinch roller 28a correspond to the guide plate 14, the card C can be securely fed into the card accommodating section 12.

The cards C are piled in the card accommodating section 12.

If the card C located at the read-write position does not overlap the guide plate 14, length of the card processing apparatus A in the card feeding direction must be long. But, in the present embodiment, the card C located at the read-write position corresponds to or overlaps a part of the guide plate 14 on the card outlet 8 side, so that the length of the card processing apparatus A can be short. Namely, the compact apparatus A can be produced.

Note that, the card C located at the read-write position corresponds to or overlaps a part of the guide plate 14 on the card accommodating section 12 side. In this case, the card C located at the read-write position is once returned to the position short of the dividing position, then the position of the guide plate 14 is changed so as to feed the card C toward the card outlet 8, which is located on the opposite side with respect to the guide plate 14.

Successively, the action of the card processing apparatus A, which treats money inserted in the money identification unit E, will be explained.

When the player inserts some money into the money identification unit E during the game, if the card C is located at the read-write position of the card processing apparatus A, the control section 3 receives data of an amount of inserted money from the unit E and adds the amount of money inserted to the present amount of money stored in the card C. Further, the control section 3 rewrites the added amount of money as an updated amount of money. Namely, the present amount money of the card C is replaced with the added amount of money. Therefore, the player can further borrow pachinko balls, whose number is equal to or less than the number corresponding to the replaced amount of money.

When the player inserts some money into the money identification unit E, if the player inserts no card into the card processing apparatus A or the card C inserted was accommodated in the card accommodating section 12 or collected in the card collecting storage S, the control section 3 receives data of an amount of inserted money from the unit E and transfers one card C, which has been accommodated in the card accommodating section 12, from the card accommodating section 12 to the read-write position by the transferring means. Then, the control section 3 rewrites the amount of money inserted in the card C as the updated amount of money. Therefore, the player can borrow pachinko balls, whose number is equal to or less than the number corresponding to the updated amount of money.

The action of the control section 3, which transfers one card C from the card accommodating section 12 to the read-write position, will be explained.

Figure 10:
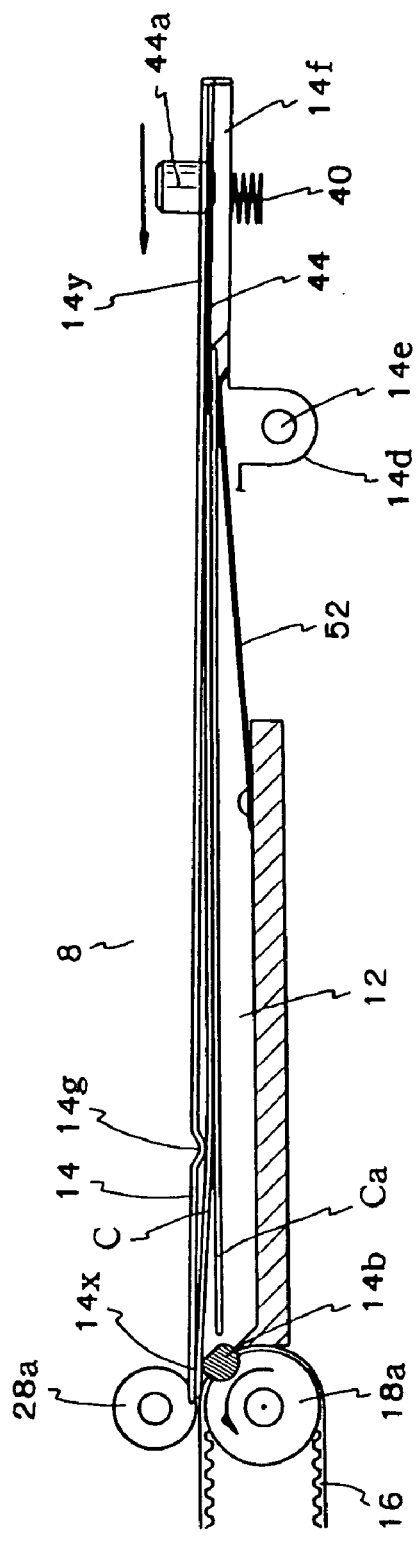
FIG. 10 is an explanation view, in which one of the card-shaped storage media is transferred to the read-write position from the card accommodating section.

Firstly, the control section 3 moves the timing belt 16 in the reverse direction, namely moves the timing belt 16 toward the card inlet 4. Then, the control section 3 drives the solenoid unit 48 so as to move the kick plate 44 toward the card accommodating section 12 (see FIG. 10). At that time, inner ends of the cards C piled in the card accommodating section 12 are biased toward the guide plate 14 by the leaf spring 52, so that the outermost card C directly contacts the guide plate 14. Therefore, the kick plate 44, whose thickness is slightly thinner than that of the card C and which can be moved along the guide plate 14, contacts an end face of the outermost card C, so that the kick plate 44 moves the outermost card C toward outside of the card accommodating section 12. The other end of the outermost card C is introduced to the space between the guide plate 14 and the restraining pin 14b by the flat face of the restraining pin 14b. With this action, the card C can pass through the space and enter the space between the timing belt 16 and the pinch roller 28a. Then, the card C is fed to the read-write position by the feeding means. Further, the control section 3 decrements the memory counter, which indicates the present number of the accommodated cards C.

When the card C is fed to the read-write position, another card Ca, which has been accommodated in the card accommodating section 12, is often moved together with the outermost card C by a frictional force, etc., but the width of the space between the restraining pin 14b and the guide plate 14 is narrower than thickness of the cards C and Ca. Therefore, only one card C can pass the space.

When the card C is transferred to the read-write position, the control section 3 writes the amount of money inserted in the card C as the updated amount of money. Therefore, the player can borrow pachinko balls to play games.

When the player finishes games, the card C located at the read-write position is reissued from the card inlet 4 to the player, accommodated in the card accommodating section 12 again, or collected in the card collecting storage S.

In the card processing apparatus A of the present embodiment, the card C, which has been once accommodated in the card accommodating section 12, can be reissued. Therefore, an amount of money inserted in the money identification unit E can be written in the card C, and the card C can be reissued. The card processing apparatus A can be assembled in the narrow space between the adjacent pachinko machines together with the money identification unit E and the ball lending unit F.

In the card processing apparatus A, if the card accommodating section 12 is full-filled with the cards C, a new card C, which is newly inserted, is discharged from the card outlet 8 and collected in the collecting storage S, which is located under the apparatus A. Therefore, even if the card accommodating section 12 is full-filled, employees of the pachinko hall need not collect the cards C from the apparatus A. Namely, the pachinko machines can be continuously operated. Since volume of the collecting storage S can be optionally designed, the large collecting storage S can be used. If the collecting storage S can be easily opened and closed, the employees can easily collect the cards C.

As described above, the card processing apparatus A is thin and has the simple structure, the apparatus A can be assembled in the narrow space between the pachinko machines.

In the present embodiment, six cards C can be accommodated in the card accommodating section 12. The inventors of the present invention researched number of newly issuing cards from one card processing apparatus a day and number of collecting cards through the same card processing apparatus a day. According to the research, required number of the cards for each card processing apparatus a day is about six. Therefore, enough number of accommodating the cards C is around six. Note that, the number of accommodating the cards C is not limited to six, and it may be optionally determined.

In the present embodiment, when the value (the amount of money) stored in the card C is zero, the card C is accommodated or collected. Treatment of the card C is not limited to the present embodiment. For example, if the card processing apparatus A detects a bad card, e.g., illegal or fabricated card, broken card whose storing means is broken, the apparatus A may discharge and collect the bad card.

In the present embodiment, the card processing apparatus A is assembled with the ball lending unit F of the pachinko machine. However, use of the apparatus A is not limited to the pachinko machine. The apparatus A may be used for many kinds of apparatuses, which read data from and/or writes data in card-shaped storage media.

The invention may be embodied in other specific forms without departing from the spirit of essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A card processing apparatus, comprising:
 a body proper having a card inlet, from which a card-shaped storage medium is inserted, a card feeding path communicating to the card inlet, a card accommodating section communicating to the card feeding path and accommodating card-shaped storage media, and a card outlet communicating to the card feeding path;
 means for feeding the card-shaped storage medium, which has been inserted from the card inlet, to the card accommodating section, outside of the card inlet or outside of the card outlet via the card feeding path;

means for processing the card-shaped storage medium, said processing means being located at a read-write position on the card feeding path, said processing means reading data from and writing data in the card-shaped storage medium;

means for transferring the card-shaped storage medium, which has been accommodated in the card accommodating section, to the read-write position one by one;

a movable guide section distributing the card-shaped storage medium to the card accommodating section or the card outlet according to a position thereof;

means for changing the position of said movable guide section; and a control section controlling said changing means and said feeding means on the basis of data, which have been read from or written in the card-shaped storage medium located at the read-write position, so as to selectively feed the card-shaped storage medium to the card accommodating section, outside of the card inlet or outside of the card outlet, wherein said card outlet is formed between a wall of the feeding path and the movable guide section, said card accommodating section is formed between the movable guide section and a wall of the feeding path on the opposite side of the card outlet with respect to the movable guide section, and said movable guide section acts as a partition separating the card accommodating section and the card outlet.

2. The card processing apparatus according to claim 1, wherein said movable guidesection is a plate.

3. The card processing apparatus according to claim 1, wherein said movable guide section is capable of turning about a shaft, which is perpendicular to a feeding direction of the card-shaped storage medium along the card feeding path, and said movable guide section distributes the card-shaped storage medium to the card accommodating section or the card outlet according to a tuning angle thereof.

4. The card processing apparatus according to claim 1, wherein said movable guide section has a projected portion projecting toward the card accommodating section so as to contact the card-shaped storage medium, which has been accommodated in the card accommodating section, and form a space, through which another card-shaped storage medium can be inserted, between said movable guide section and the card-shaped storage medium, which has been already accommodated in the card accommodating section.

5. The card processing apparatus according to claim 1, wherein a card restraining section is provided to a card introducing end of said movable guide section so as to form a space, through which one card-shaped storage medium can pass, between the card restraining section and a surface of said movable guide section on the card accommodating section side.

6. The card processing apparatus according to claim 1, wherein said transferring means has a pusher contacting one of the card-shaped storage media accommodated in the card accommodating section and moving the same to a position, at which said feeding means is capable of feeding, and said feeding means moves the card-shaped storage medium, which has been moved by the pusher, to the read-write position.

7. The card processing apparatus according to claim 1, wherein the card-shaped storage medium located at the read-write position corresponds to said movable guide section.

8. The card processing apparatus according to claim 1, wherein said feeding means includes driving rollers and pinch rollers, which pinch the card-shaped storage medium from both sides.

9. The card processing apparatus according to claim 8, wherein the driving roller and the pinch roller correspond to said movable guide section, and said movable guide section has a notch for avoiding an interference with the driving roller and the pinch roller corresponding thereto.

10. The card processing apparatus according to claim 8, wherein said control section guides a forward end of the card-shaped storage medium toward the card accommodating section and makes said movable guide section move toward the card accommodating section so as to press the card-shaped storage medium onto the driving roller and the pinch roller located on the card accommodating section side when the card-shaped storage medium is fed to the card accommodating section.

11. The card processing apparatus according to claim 1, further comprising a card collecting storage, which is communicated to the card outlet and which is capable of collecting the card-shaped media discharged from the card outlet.

12. The card processing apparatus according to claim 1, wherein each of the card-shaped storage media stores a datum of value, said processing means reads the value from the card-shaped storage media, subtracts a consumed value from the read amount of value, and replaces the value with the subtracted value, said control section feeds the card-shaped storage medium to outside of the card inlet if the subtracted value is not zero when using the card-shaped storage medium is completed, said control section feeds the card-shaped storage medium to the card accommodating section if the subtracted value is zero and the card accommodating section is not filled with the card-shaped storage media when using the card-shaped storage medium is completed, and said control section feeds the card-shaped storage medium to outside of the card outlet if the subtracted value is zero and the card accommodating section is filled with the card-shaped storage media when using the card-shaped storage medium is completed.

13. The card processing apparatus according to claim 12, wherein a money identification unit, which is capable of identifying money inserted thereto, is connected, said control section moves one card-shaped storage medium from the card accommodating section to the read-write position by said transferring means if no card-shaped storage medium is located at the read-write position when said money identification unit identifies money, and said processing means adds a value of the money, which has been identified by said money identification unit, to the value, which has been read from the card-shaped storage medium located at the read-write position, and replaces the value with the added value.

14. The card processing apparatus according to claim 2, wherein said movable guide section is provided in parallel to a surface of the card-shaped storage medium fed on the feeding path.

15. A card processing apparatus, comprising:
a body proper having a card inlet, from which a card-shaped storage medium is inserted, a card feeding path communicating to the card inlet, a card accommodating section communicating to the card feeding path and accommodating card-shaped storage media, and a card outlet communicating to the card feeding path;
means for feeding the card-shaped storage medium, which has been inserted from the card inlet, to the card accommodating section, outside of the card inlet or outside of the card outlet via the card feeding path;
means for processing the card-shaped storage medium, said processing means being located at a read-write position on the card feeding path, said processing means reading data from and writing data in the card-shaped storage medium;
means for transferring the card-shaped storage medium, which has been accommodated in the card accommodating section, to the read-write position one by one;
a movable guide section distributing the card-shaped storage medium to the card accommodating section or the card outlet according to a position thereof;
means for changing the position of said movable guide section; and
a control section controlling said changing means and said feeding means on the basis of data, which have been read from or written in the card-shaped storage medium located at the read-write position, so as to selectively feed the card-shaped storage medium to the card accommodating section, outside of the card inlet or outside of the card outlet,
wherein said feeding means includes driving rollers and pinch rollers, which pinch the card-shaped storage medium from both sides,
the driving roller and the pinch roller correspond to said movable guide section, and
said movable guide section has a notch for avoiding an interference with the driving roller and the pinch roller corresponding thereto.

16. The card processing apparatus according to claim 15, wherein said control section guides a forward end of the card-shaped storage medium toward the card accommodating section and makes said movable guide section move toward the card accommodating section so as to press the card-shaped storage medium onto the driving roller and the pinch roller located on the card accommodating section side when the card-shaped storage medium is fed to the card accommodating section.

17. A card processing apparatus, comprising:
a body proper having a card inlet, from which a card-shaped storage medium is inserted, a card feeding path communicating to the card inlet, a card accommodating section communicating to the card feeding path and accommodating card-shaped storage media, and a card outlet communicating to the card feeding path;
means for feeding the card-shaped storage medium, which has been inserted from the card inlet, to the card accommodating section, outside of the card inlet or outside of the card outlet via the card feeding path;
means for processing the card-shaped storage medium, said processing means being located at a read-write position on the card feeding path, said processing means reading data from and writing data in the card-shaped storage medium;
means for transferring the card-shaped storage medium, which has been accommodated in the card accommodating section, to the read-write position one by one;
a movable guide section distributing the card-shaped storage medium to the card accommodating section or the card outlet according to a position thereof;
means for changing the position of said movable guide section; and
a control section controlling said changing means and said feeding means on the basis of data, which have been read from or written in the card-shaped storage medium located at the read-write position, so as to selectively feed the card-shaped storage medium to the card accommodating section, outside of the card inlet or outside of the card outlet,
wherein each of the card-shaped storage media stores a datum of value,
said processing means reads the value from the card-shaped storage media, subtracts a consumed value from the read amount of value, and replaces the value with the subtracted value,
said control section feeds the card-shaped storage medium to outside of the card inlet if the subtracted value is not zero when using the card-shaped storage medium is completed,
said control section feeds the card-shaped storage medium to the card accommodating section if the subtracted value is zero and the card accommodating section is not filled with the card-shaped storage media when using the card-shaped storage medium is completed, and
said control section feeds the card-shaped storage medium to outside of the card outlet if the subtracted value is zero and the card accommodating section is filled with the card-shaped storage media when using the card-shaped storage medium is completed.

18. The card processing apparatus according to claim 17, wherein a money identification unit, which is capable of identifying money inserted thereto, is connected,
said control section moves one card-shaped storage medium from the card accommodating section to the read-write position by said transferring means if no card-shaped storage medium is located at the read-write position when said money identification unit identifies money, and
said processing means adds a value of the money, which has been identified by said money identification unit, to the value, which has been read from the card-shaped storage medium located at the read-write position, and replaces the value with the added value.

* * * * *